United States Patent
Okubo et al.

(10) Patent No.: US 12,358,505 B2
(45) Date of Patent: Jul. 15, 2025

(54) VEHICLE CONTROL SYSTEM

(71) Applicant: HONDA MOTOR CO., LTD., Tokyo (JP)

(72) Inventors: Naoto Okubo, Tokyo (JP); Masahiro Hirota, Tokyo (JP); Ryo Koyama, Tokyo (JP); Jasvin Patheja, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 389 days.

(21) Appl. No.: 17/559,269

(22) Filed: Dec. 22, 2021

(65) Prior Publication Data
US 2022/0203990 A1  Jun. 30, 2022

(30) Foreign Application Priority Data

Dec. 28, 2020 (JP) .................................. 2020-219221

(51) Int. Cl.
*B60W 30/18* (2012.01)
*B60W 10/18* (2012.01)
(Continued)

(52) U.S. Cl.
CPC .... *B60W 30/18145* (2013.01); *B60W 10/184* (2013.01); *B60W 10/20* (2013.01);
(Continued)

(58) Field of Classification Search
CPC ......... B60W 30/18145; B60W 10/184; B60W 10/20; B60W 2520/125; B60W 2520/14;
(Continued)

(56) References Cited

U.S. PATENT DOCUMENTS

| 5,752,575 A | 5/1998 | Konishi et al. |
| 10,543,818 B2 | 1/2020 | Lian et al. |
| (Continued) | | |

FOREIGN PATENT DOCUMENTS

| CA | 2220905 C | 1/2002 |
| CN | 111361548 A | 7/2020 |
| (Continued) | | |

OTHER PUBLICATIONS

Office Action for Chinese Patent Application 202111599177.4 dated Sep. 28, 2023; 7 pp.

*Primary Examiner* — Adam D Tissot
(74) *Attorney, Agent, or Firm* — Armstrong Teasdale LLP

(57) ABSTRACT

A vehicle control system provided with a control device that includes a control lateral acceleration calculation unit that calculates a control lateral acceleration from a lateral acceleration obtained by using a planar two degrees of freedom model of a vehicle based on vehicle state information and disregarding a second order delay component determined from vehicle specifications, a steer drag differential value calculation unit that calculates a steer drag differential value, an additional deceleration calculation unit that calculates an additional deceleration to be applied to the vehicle according to the steer drag differential value, and an additional braking force calculation unit that calculates an additional braking force to be generated by the braking force generator according to the additional deceleration.

5 Claims, 10 Drawing Sheets

(51) Int. Cl.
  *B60W 10/184* (2012.01)
  *B60W 10/20* (2006.01)
  *B62D 6/10* (2006.01)
  *B62D 7/15* (2006.01)
(52) U.S. Cl.
  CPC .............. *B62D 6/10* (2013.01); *B62D 7/159* (2013.01); *B60W 2520/125* (2013.01); *B60W 2520/14* (2013.01); *B60W 2720/403* (2013.01)
(58) Field of Classification Search
  CPC . B60W 2720/403; B60W 30/045; B62D 6/10; B62D 7/159; B62D 9/002; B60T 2201/16; B60T 8/1755; B60T 8/17551; B60T 8/17557
  USPC .......................................................... 701/41
  See application file for complete search history.

(56) References Cited

U.S. PATENT DOCUMENTS

| | | | |
|---|---|---|---|
| 11,318,945 | B2 | 5/2022 | Okubo et al. |
| 2003/0125847 | A1* | 7/2003 | Tinskey ................ B60T 8/1755 |
| | | | 701/1 |
| 2009/0112404 | A1* | 4/2009 | Imura ................... B60W 30/04 |
| | | | 701/41 |
| 2015/0032332 | A1* | 1/2015 | Kikuchi .............. B60W 30/025 |
| | | | 701/37 |
| 2015/0291210 | A1* | 10/2015 | Kageyama ............... B62D 5/04 |
| | | | 701/41 |
| 2015/0307125 | A1* | 10/2015 | Kunihiro ................ B62D 6/003 |
| | | | 701/42 |
| 2016/0001774 | A1* | 1/2016 | Nakada .............. B62D 15/0285 |
| | | | 701/41 |
| 2017/0088174 | A1* | 3/2017 | Inoue ..................... B62D 6/003 |
| 2017/0101108 | A1* | 4/2017 | Singh .................. B60C 23/0488 |
| 2018/0362022 | A1* | 12/2018 | Kasaiezadeh Mahabadi .............. B60W 30/045 |
| 2019/0126711 | A1* | 5/2019 | Giovanardi .......... B60G 17/018 |
| 2019/0196487 | A1* | 6/2019 | Akiyama ........ B60W 30/18163 |
| 2020/0039523 | A1* | 2/2020 | Ghasemalizadeh .. B62D 15/025 |
| 2020/0172102 | A1 | 6/2020 | Hirota et al. |
| 2021/0206379 | A1* | 7/2021 | Bobier-Tiu ......... B60T 8/17551 |

FOREIGN PATENT DOCUMENTS

| | | | |
|---|---|---|---|
| DE | 19539670 A1 | 5/1996 | |
| DE | 102010022171 A1 * | 11/2011 | ............ B60K 35/00 |
| JP | 2016150730 A | 8/2016 | |
| JP | 6395789 B2 * | 9/2018 | |
| WO | 2017025042 A1 | 2/2017 | |

* cited by examiner

VEHICLE CONTROL SYSTEM

TECHNICAL FIELD

The present invention relates to a vehicle control system that controls a braking force generated by a vehicle braking force generator to improve the handling of the vehicle.

BACKGROUND ART

In a known vehicle control system for improving the cornering performance of a vehicle, a braking force is generated in the front wheels at the start of a cornering operation, without regard to a braking operation of the vehicle operator, so that the load of the vehicle is shifted to the side of the front wheels. See JP6395789B2, for instance. By moving the load of the vehicle to the side of the front wheels, the frictional force between the front wheels and the road surface is increased, and the resultant increase in the lateral force generated in the front wheels improves the cornering performance of the vehicle. In the vehicle control system disclosed in JP6395789B2, the front wheel steering angle and the vehicle speed are acquired for estimating the front wheel lateral force, and a steer drag given as a rearward component of the front wheel lateral force is calculated from the front wheel lateral force and the front wheel steering angle. A forced pitch moment or an additional pitch moment that is to be applied to the vehicle is calculate from the time differential of the steer drag, and the target braking force that is to be generated by the braking force generating device is calculated from the calculated additional pitch moment.

In the vehicle control system disclosed in JP6395789B2, in calculating the additional pitch moment for generating the required additional deceleration, the front wheel lateral force is calculated by using a vehicle reference model (planar two-dimensional model) which receives the angular position of the steering shaft corresponding to the front wheel steering angle as an input to provide a front wheel lateral force associated with the lateral acceleration of the vehicle. Therefore, a secondary delay component which depends on the specifications of the vehicle is inevitably generated in the behavior of the vehicle so that the additional deceleration cannot be applied at as an appropriate timing as desired.

SUMMARY OF THE INVENTION

In view of such a problem of the prior art, a primary object of the present invention is to provide a vehicle control system that can generate an additional deceleration in a vehicle at an appropriate timing.

To achieve such an object, the present invention provides a vehicle control system (30), comprising: a braking force generator (6, 22) that generates a braking force that acts on a vehicle; a control device (31) that controls the braking force generated by the braking force generator; and a vehicle state information acquisition device (33, 34) that acquires vehicle state information including a vehicle speed (V) and a steering angle ($\delta$) of front wheels (4A) of the vehicle, wherein the control device includes a control lateral acceleration calculation unit (41) that calculates a control lateral acceleration (Gy) from a lateral acceleration obtained by using a planar two degrees of freedom model of the vehicle based on the vehicle state information and disregarding a second order delay component determined from vehicle specifications, a steer drag differential value calculation unit (42) that calculates a steer drag differential value (d/dt (GxD)) obtained by differentiating a steer drag (GxD) which is given as a component of a lateral force of the front wheels directed rearward of the vehicle according to the control lateral acceleration and the vehicle state information, an additional deceleration calculation unit (43) that calculates an additional deceleration (Gxadd) to be applied to the vehicle according to the steer drag differential value, and an additional braking force calculation unit (45) that calculates an additional braking force (Fbadd) to be generated by the braking force generator according to the additional deceleration.

By thus disregarding or ignoring the second-order delay component, which is determined by the vehicle specifications, in the lateral acceleration obtained by using a planar two degrees of freedom model of the vehicle, a control lateral acceleration that is advanced in phase with respect to the lateral acceleration is used for the calculation of the additional deceleration so as to suppress the second order delay component. As a result, the additional deceleration force (braking force) can be applied to the vehicle at an appropriate timing.

Preferably, the vehicle state information acquisition device includes a velocity sensor (35) that detects an angular velocity or a velocity corresponding to a steering angular velocity (w) of the front wheels, and the control lateral acceleration calculation unit (41) calculates the control lateral acceleration (Gy) by using the steering angular velocity.

Thereby, the control lateral acceleration calculation unit uses the steering angular velocity, instead of the time differential value of the steering angle, to calculate the control lateral acceleration so that the formula for calculating the control lateral acceleration can consist of a lower order equation. As a result, calculation delay is suppressed so that the control device can calculate the control lateral acceleration in a more favorable manner. Also, if the control device fails to receive information on the steering angle at a certain control cycle and holds the previous value instead of the missed value, the differential value may rapidly fluctuate to an unacceptable extent. However, according to this aspect of the present invention, since the equation for computing the control lateral acceleration consists of a relatively low order equation, any undesired fluctuations (sudden changes) of the control lateral acceleration due to information discontinuity can be minimized.

Preferably, the control lateral acceleration calculation unit (41) calculates the control lateral acceleration (Gy) by adding a first multiplication value obtained by multiplying the steering angle ($\delta$) by a first correction value corresponding to the vehicle speed (V) to a second multiplication value obtained by multiplying the steering angular velocity ($\omega$) by a second correction value corresponding to the vehicle speed (V).

Thereby, the responsiveness of the control lateral acceleration can be made to depend on the vehicle speed in a way corresponding to the responsiveness of the actual lateral acceleration depends on the vehicle speed.

Preferably, the control lateral acceleration calculation unit (41) performs a low pass filter process on the control lateral acceleration (Gy).

Thereby, undesired rapid fluctuations in the control lateral acceleration due to rapid fluctuations in the steering angular velocity can be avoided, and noises in the control lateral acceleration can be removed so that the braking force can be applied to the vehicle in a stable manner.

Preferably, the control device (31) further comprises a dead band processing unit (54) that performs a dead band process on the control lateral acceleration (Gy), the dead band processing unit outputting zero for the control lateral acceleration when an absolute value of the inputted control lateral acceleration is equal to or smaller than a prescribed threshold value ($|Gy| \leq Gyth$), and a value which is smaller by the threshold value than the absolute value of the inputted control lateral acceleration for the control lateral acceleration when the absolute value of the inputted control lateral acceleration is larger than the prescribed threshold value ($|Gy| > Gyth$).

According to this arrangement, in the dead zone region where the absolute value of the input is equal to or less than a predetermined threshold value, 0 is outputted for the control lateral acceleration so that no additional deceleration is generated. Therefore, the vehicle behaves in the same way as the base vehicle. In other words, in the range of the front wheel steering angle where the vehicle travels substantially straight ahead or in the dead zone region, the lateral acceleration for a given steering input is the same as that of the base vehicle, and the vehicle maintains the same response as the base vehicle. Further, by reducing the frequency of generating the additional braking force, the decrease in the durability of the braking force generating device is prevented from being impaired. On the other hand, when the control lateral acceleration progressively increases and exceeds a predetermined threshold value, the control lateral acceleration is outputted as a continuous value increasing from 0 after the dead zone processing. Thus, the additional deceleration is generated as a value that increases gradually so that the cornering performance of the vehicle can be improved while maintaining a smooth vehicle behavior.

Preferably, the threshold value (Gyth) becomes larger with an increase in the vehicle speed (V).

Thereby, the vehicle control device is allowed to operate so as to properly take into account the changes the characteristics of the vehicle such as the steering reaction force and the cornering response of the vehicle depending on the vehicle speed. In particular, the additional braking force is prevented from acting on the vehicle excessively frequently in high speed ranges.

Preferably, the vehicle state information further includes the steering angular velocity ($\omega$) of the front wheels (4A), and the steer drag differential value calculation unit (42) calculates the steer drag differential value (d/dt (GxD)) by using the steering angular velocity as the vehicle state information.

Since the control device calculates the control lateral acceleration by using the steering angular velocity (which is directly detected) instead of the time differential value of the steering angle, the fluctuations (sudden change) of the additional deceleration due to any information discontinuity may be properly suppressed.

Thus, according to the present invention, an appropriate additional deceleration for improved vehicle handling can be generated in the vehicle at an appropriate timing.

BRIEF DESCRIPTION OF THE DRAWING(S)

DESCRIPTION OF THE PREFERRED EMBODIMENT(S)

A vehicle control system 30 according to an embodiment of the present invention is described in the following with reference to the appended drawings.

Figure 1:
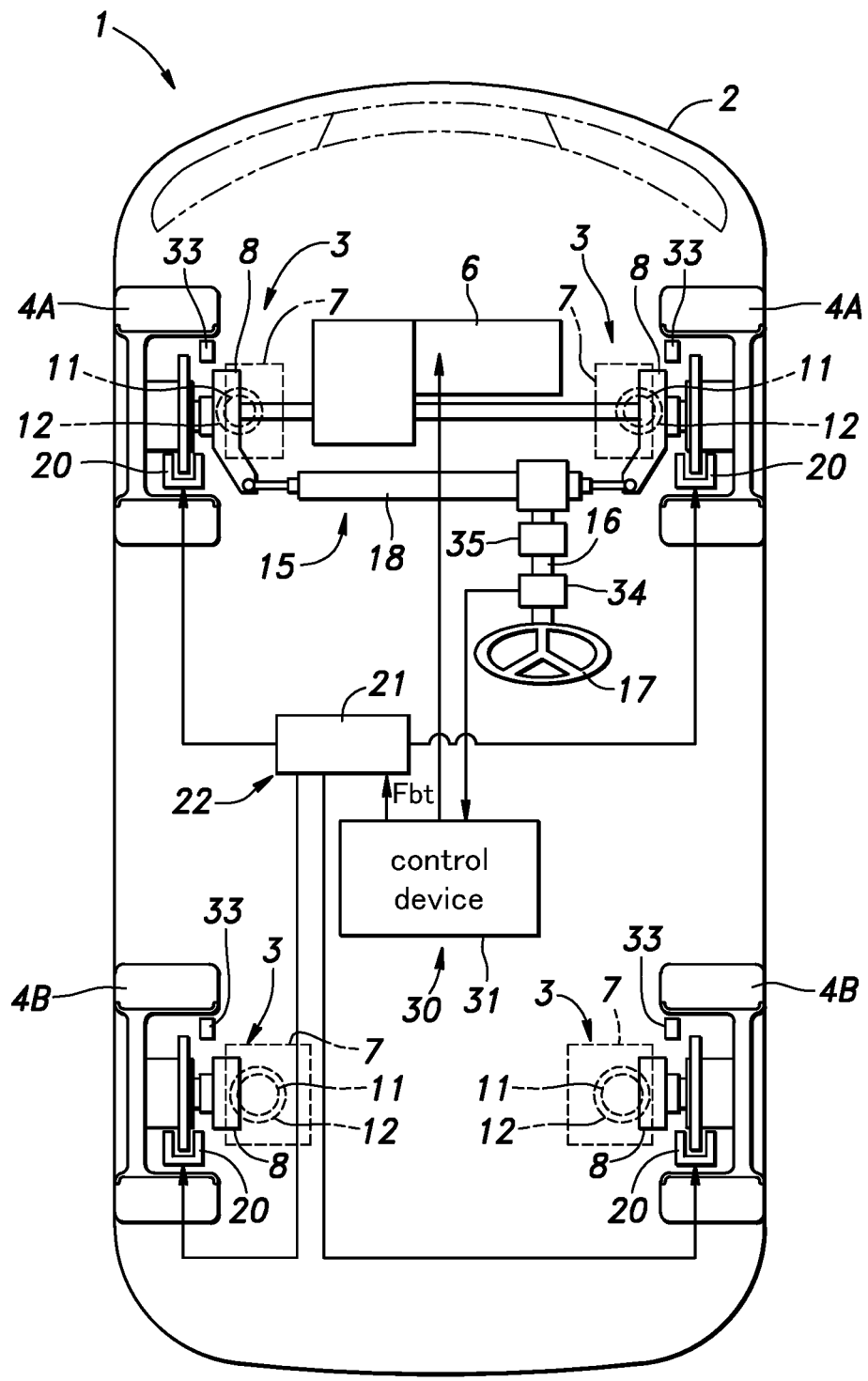
FIG. 1 is a block diagram of a vehicle equipped with a vehicle control system according to an embodiment of the present invention.

FIG. 1 is a schematic diagram of the structure of a vehicle 1 fitted with a vehicle control system 30 according to the present embodiment. As shown in FIG. 1, the vehicle 1 of this embodiment consists of a four-wheeled vehicle including a vehicle body 2 forming the structural frame of the vehicle 1 supporting a pair of front wheels 4A and a pair of rear wheels 4B via respective suspension devices 3.

The vehicle 1 is provided with a power plant 6 that drives the wheels 4 (4A, 4B). The power plant 6 may consist of at least one of an internal combustion engine such as a gasoline engine and a diesel engine and an electric motor. The vehicle 1 of the present embodiment is a front-wheel drive vehicle in which the power plant 6 is a gasoline engine and the driving force and braking force (rotational resistance) of the power plant 6 are transmitted to the front wheels 4A. The power plant 6 is a driving force generating device that generates the driving force that acts on the vehicle 1, and is also a braking force generating device that generates a braking force that acts on the vehicle 1. Alternatively, the vehicle 1 may be a four-wheel drive vehicle or a rear-wheel drive vehicle.

Each suspension device 3 includes a suspension arm 7 pivotally supported by the vehicle body 2, a knuckle 8 supported by the suspension arm 7 to rotatably support the front wheel 4A or the rear wheel 4B, and a spring 11 and a damper 12 provided between the vehicle body 2 and the suspension arm 7.

The vehicle 1 is provided with a steering device 15 that steers the front wheels 4A. The steering device 15 includes a steering shaft 16 rotatably supported by the vehicle body 2 around an axis thereof, a steering wheel 17 provided at the upper end of the steering shaft 16, a pinion provided at the lower end of the steering shaft 16, and a rack 18 extending laterally and meshing with the pinion. The two ends of the rack 18 are connected to left and right knuckles 8 via tie rods, respectively. When the steering wheel 17 connected to the steering shaft 16 is turned, the rack 18 moves laterally in the corresponding direction, causing the front wheels 4A to be steered via the corresponding knuckles 8. Further, the steering shaft 16 is fitted with an electric motor that applies assist torque to the steering shaft 16 in response to a steering input from the driver.

Each of the front wheels 4A and the rear wheels 4B is provided with a brake device 20. The brake device 20 may consist of a disc brake device which is configured to generate a braking force on the corresponding wheel 4A, 4B by means of the oil pressure supplied from an oil pressure supply device 21. A brake system 22 is formed by the brake devices 20 of the different wheels and the oil pressure supply device 21. The brake system 22 is a braking force generating system that generates a braking force acting on the vehicle 1. The oil pressure supply device 21 is configured to independently control the hydraulic pressure supplied to each brake device 20 so that the braking forces applied to the front wheels 4A and the rear wheels 4B of the brake system 22 can be changed independently of each other.

The vehicle 1 is provided with a vehicle control system 30 that controls the behavior of the vehicle 1. The vehicle control system 30 includes a control device 31 as a main part thereof. The control device 31 is essentially an electronic control circuit (ECU) composed of a microcomputer, ROM, RAM, a peripheral circuit, an input/output interface, various drivers, and the like. The control device 31 is connected to the power plant 6, the oil pressure supply device 21, and various sensors so as to be able to exchange signals via a communication means such as CAN (Controller Area Network).

The vehicle body 2 is provided with an accelerator pedal sensor that detects the amount of operation of the accelerator pedal and a brake pedal sensor that detects the amount of operation of the brake pedal. The control device 31 executes multiple control operations. In one of these control operations, a target braking force Fbt to be generated by the brake system 22 is calculated from the operation amount of the brake pedal, and an oil pressure supply device 21 is controlled according to the target braking force Fbt. In another control operation, the control device 31 controls the power plant 6 based on the operation amount of the accelerator pedal.

The control device 31 calculates an additional deceleration Gxadd to be added or applied to the vehicle 1 based on the vehicle state amounts representing the dynamic state of the vehicle 1 regardless of the driver's accelerator pedal operation and brake pedal operation, and controls at least one of the brake system 22 and the power plant 6 so as to generate an additional braking force Fbadd corresponding to the additional deceleration Gxadd. The vehicle state amounts include the vehicle speed V, which is the speed of the vehicle 1, the front wheel steering angle $\delta$, which is the steering angle of the front wheels 4A, the front wheel steering angular velocity $\omega$, which is the steering angular velocity of the front wheels 4A, and the like.

The vehicle body 2 is provided with vehicle speed sensors 33, a front wheel steering angle sensor 34, and a front wheel steering angular velocity sensor 35 as vehicle state amount detection devices. Each of the front wheels 4A and the rear wheels 4B is provided with the corresponding vehicle speed sensor 33 which outputs a pulse signal generated in response to the rotation of the corresponding wheel 4A, 4B to the control device 31. The control device 31 acquires the wheel speeds of the front wheels 4A and the rear wheels 4B based on the signals from the vehicle speed sensors 33, and acquires the vehicle speed V by averaging the wheel speeds of the different wheels. The vehicle speed V is acquired as a positive value when moving forward and as a negative value when moving backward.

The front wheel steering angle sensor 34 outputs a signal corresponding to the rotational angle of the steering shaft 16 (steering wheel steering angle) to the control device 31. The control device 31 converts the rotational angle input from the front wheel steering angle sensor 34 into a rotational angle of the front wheels 4A (front wheel steering angle), which are the steered wheels, by multiplying the steering wheel steering angle by a predetermined gear ratio, and acquires the front wheel steering angle $\delta$. The front wheel steering angle $\delta$ is acquired as a positive value during a left turn operation and as a negative value during a right turn operation.

The front wheel steering angular velocity sensor 35 outputs a signal corresponding to the rotational angular velocity (steering wheel steering angular velocity) of the steering shaft 16 to the control device 31. The control device 31 converts the angular velocity input from the front wheel steering angular velocity sensor 35 into the steering angular velocity of the front wheels 4A (front wheel steering angular velocity), which are the steered wheels, by multiplying the angular velocity input from the front wheel steering angular velocity sensor 35 by a predetermined gear ratio, and acquires the front wheel steering angular velocity $\omega$. The front wheel steering angular velocity $\omega$ is acquired as a positive value during a leftward turning operation and as a negative value during a rightward turning operation. The front wheel steering angular velocity $\omega$ is a time differentiated value of the front wheel steering angle $\delta$ and is represented by $d/dt (\delta)$. Hereinafter, in mathematical formulas and drawings, d/dt may be represented by a dot placed above the variable. In this particular case, the front wheel steering angular velocity $\omega$ is obtained not a value calculated by time-differentiating the front wheel steering angle $\delta$, but as a speed detection value corresponding to the angular velocity output from the front wheel steering angular velocity sensor 35.

In another embodiment, the front wheel steering angle sensor 34 detects the stroke of the rack 18 in the lateral direction, and the control device 31 multiplies the stroke input from the front wheel steering angle sensor 34 by a predetermined coefficient to obtain the front wheel steering angle $\delta$. Further, it may be arranged such that the front wheel steering angular velocity sensor 35 detects the stroke speed of the rack 18 in the lateral direction, and the control device 31 multiplies the stroke speed input from the front wheel steering angle sensor 34 by a predetermined coefficient to obtain the steering angular velocity of the front wheels 4A. The front wheel steering angular velocity is thus detected as a value corresponding to the linear stroke velocity of the rack 18.

The control device 31 serves as a vehicle speed acquisition device that acquires the vehicle speed V in cooperation with the vehicle speed sensors 33, a front wheel steering angle acquisition device that acquires the front wheel steering angle $\delta$ in cooperation with the front wheel steering angle sensor 34, and a front wheel steering angular velocity acquisition device that acquires the front wheel steering angular velocity $\omega$ in cooperation with the front wheel steering angular velocity sensor 35.

Figure 2:
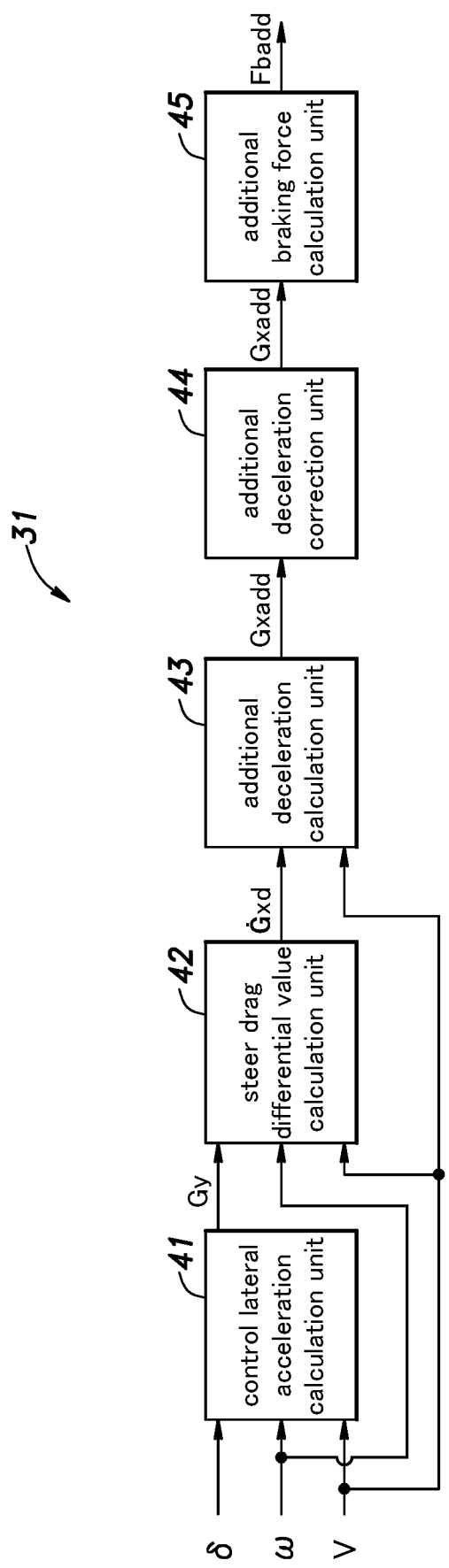
FIG. 2 is a functional block diagram of a control device included in the vehicle control system.

As shown in FIG. 2, the control device 31 includes a control lateral acceleration calculation unit 41, a steer drag differential value calculation unit 42, an additional deceleration calculation unit 43, an additional deceleration correction unit 44, and an additional braking force calculation unit 45. The control lateral acceleration calculation unit 41 calculates a control lateral acceleration Gy used for an additional deceleration control (which will be discussed hereinafter) based on the front wheel steering angle $\delta$, the front wheel steering angular velocity $\omega$, and the vehicle speed V. The steer drag differential value calculation unit 42 calculates a steer drag differential value $d/dt (GxD)$ obtained by time differentiating a steer drag GxD, which is a component of the lateral force of the front wheels 4A directed rearward of the vehicle 1, obtained from the control lateral acceleration Gy, the front wheel steering angle $\delta$, and the front wheel steering angular velocity $\omega$. The additional deceleration calculation unit 43 calculates an additional deceleration Gxadd to be applied to the vehicle 1 according to the steer drag differential value d/dt (GxD). The additional deceleration correction unit 44 corrects the additional deceleration Gxadd according to various vehicle state amounts. The additional braking force calculation unit 45 calculates the additional braking force Fbadd to be generated in the power plant 6 and/or the brake system 22 based on the corrected additional deceleration Gxadd. By operating these functional units, the control device 31 executes an additional deceleration control to generate a braking force acting on the vehicle 1 from the power plant 6 and/or the brake system 22.

In this way, the control device 31 calculates the additional braking force Fbadd based on the front wheel steering angle δ, the front wheel steering angular velocity ω and the vehicle speed V, and executes the additional deceleration control whereby the braking force to be applied to the vehicle 1 is generated by the power plant 6 and/or the brake system 22. This control process is executed by the control device 31 without using the actual lateral acceleration of the vehicle 1 detected by a lateral acceleration sensor. As a result, the control lateral acceleration Gy can be advanced in phase with respect to the actual lateral acceleration so that the additional deceleration Gxadd can be generated in the vehicle 1 earlier than when the actual lateral acceleration is used. Therefore, it is possible to reduce a time delay of the additional deceleration Gxadd that could be caused by the communication delay in acquiring the sensor information, the communication delay of the target braking force information, and the response delay of the braking force generator.

Figure 3:
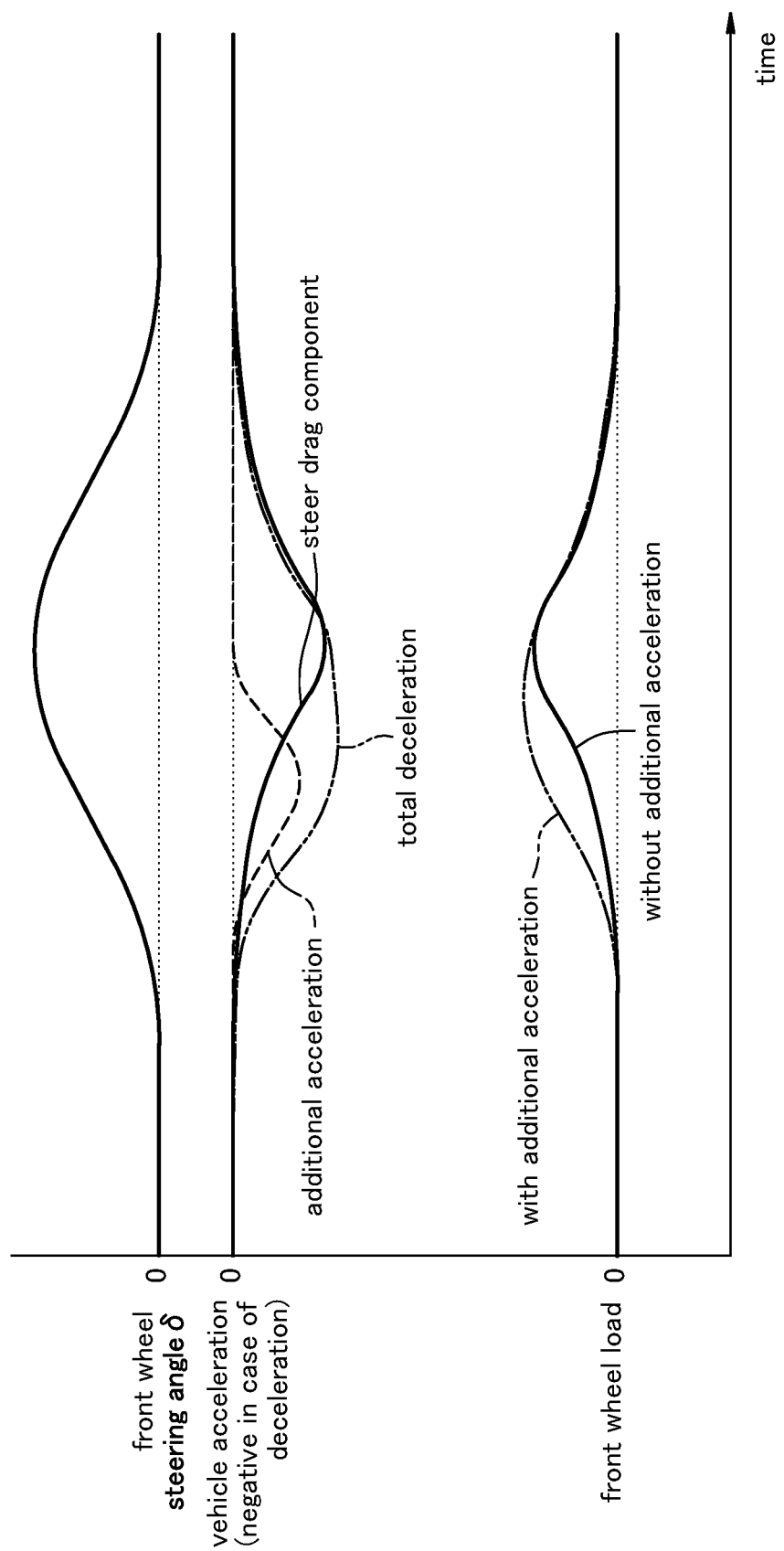
FIG. 3 is a time chart showing a mode of operation of the control device.

FIG. 3 is a time chart showing the working principle of the additional deceleration control executed by the control device 31. As shown in FIG. 3, when the steering wheel 17 is operated and the front wheel steering angle δ increases, a traveling resistance (steer drag GxD) is created in the front wheels 4A, and as shown by the solid lines, the vehicle 1 decelerates by an amount corresponding to the amount of the steer drag (due to this steer drag GxD). The deceleration of the vehicle 1 causes the front wheel load of the vehicle 1 to be increased in a corresponding amount. The deceleration of the vehicle 1 or the increase in the front wheel load corresponding to the steer drag occurs with some time delay relative to the increase of the front wheel steering angle δ. Thus, there is some response delay between the steering of the front wheels 4A and the resultant increase in the steer drag.

On the other hand, the steer drag differential value d/dt (GxD) is advanced in phase relative to the steer drag GxD by 90°. Therefore, when the additional deceleration calculation unit 43 calculates the additional deceleration Gxadd based on the steer drag differential value d/dt (GxD), and the control device 31 generates the additional braking force Fbadd based on this calculated steer drag differential value d/dt (GxD), the additional deceleration Gxadd is additionally applied to the vehicle 1 in such a manner that the total deceleration of the vehicle 1 is advanced in phase relative to the deceleration component due to the steer drag as shown by the imaginary line in FIG. 3. As a result, the front wheel load starts increasing with an advanced phase as compared with the case where no additional deceleration Gxadd is applied so that the cornering performance of the vehicle 1 is improved.

Figure 4:
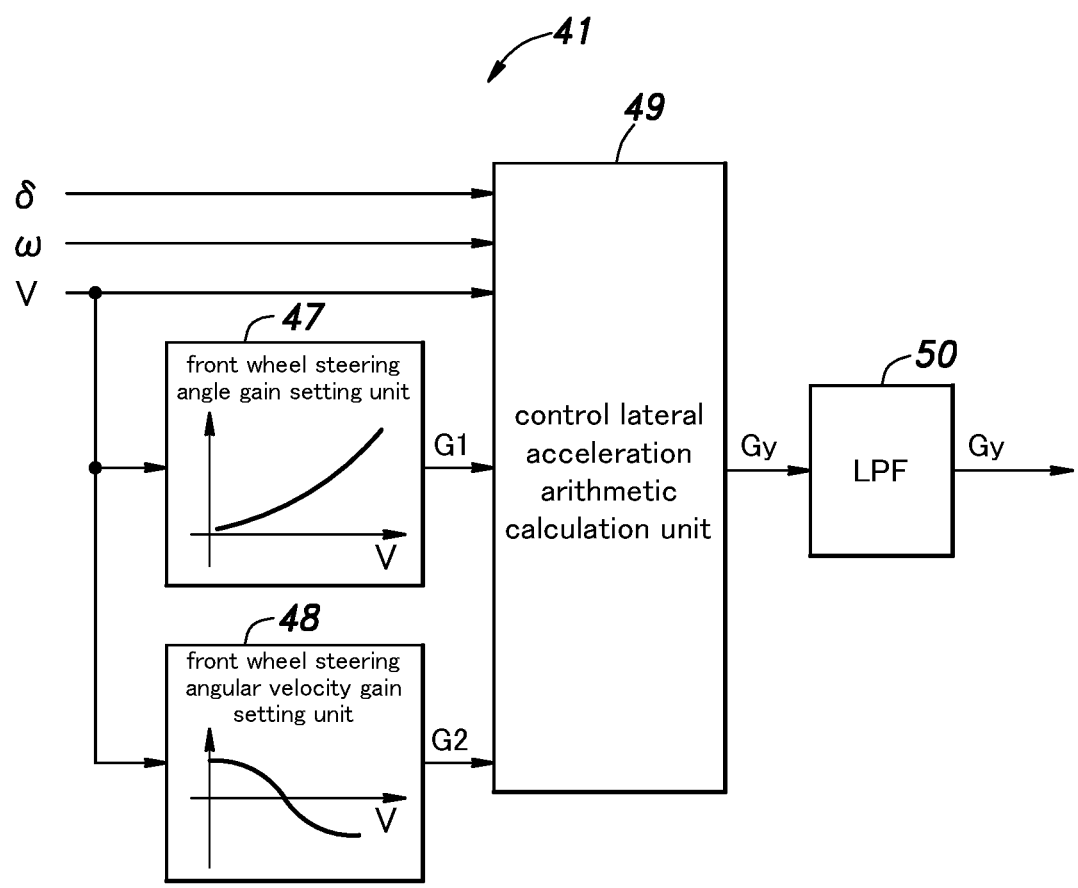
FIG. 4 is a functional block diagram of a control lateral acceleration calculation unit of the control device.

As shown in FIG. 4, the control lateral acceleration calculation unit 41 includes a front wheel steering angle gain setting unit 47, a front wheel steering angular velocity gain setting unit 48, a control lateral acceleration arithmetic calculation unit 49, and a low-pass filter (hereinafter referred to as LPF 50). The front wheel steering angle gain setting unit 47 sets a front wheel steering angle gain G1 which is a first correction value with respect to the front wheel steering angle δ used for calculating the control lateral acceleration Gy based on the vehicle speed V. The front wheel steering angular velocity gain setting unit 48 sets a front wheel steering angular velocity gain G2 which is a second correction value for the front wheel steering angular velocity ω used for calculating the control lateral acceleration Gy based on the vehicle speed V. The control lateral acceleration arithmetic calculation unit 49 calculates the control lateral acceleration Gy based on the front wheel steering angle δ, the front wheel steering angular velocity ω, the front wheel steering angle gain G1, and the front wheel steering angular velocity gain G2.

The front wheel steering angle gain setting unit 47 is provided with a front wheel steering angle gain map defining the relationship between the vehicle speed V and the front wheel steering angle gain G1 such that the desired characteristics of the responsiveness of the lateral acceleration to the front wheel steering angle δ, which changes according to the vehicle speed V, may be achieved. The front wheel steering angle gain setting unit 47 extracts a value corresponding to the vehicle speed V from the front wheel steering angle gain map, and sets the extracted value as the front wheel steering angle gain G1.

The front wheel steering angular velocity gain setting unit 48 is provided with a front wheel steering angular velocity gain map defining the relationship between the vehicle speed V and the front wheel steering angular velocity gain G2 such that the desired characteristics of the responsiveness of the lateral acceleration to the front wheel steering angular velocity ω, which changes according to the vehicle speed V, may be achieved. The front wheel steering angular velocity gain setting unit 48 extracts a value corresponding to the vehicle speed V from the front wheel steering angular velocity gain map, and sets the extracted value as the front wheel steering angular velocity gain G2.

The control lateral acceleration arithmetic calculation unit 49 calculates the control lateral acceleration Gy by calculating Equation (1) given below:

$$G_y = G1 \cdot \delta + G2 \cdot \omega \qquad (1)$$

Thus, the control lateral acceleration arithmetic calculation unit 49 calculates the first multiplication value (the first multiplication value of Equation (1)) by multiplying the front wheel steering angle δ by the front wheel steering angle gain G1 which is the first correction value based on the vehicle speed V, calculates the second multiplication value (the second multiplication value of Equation (1)) by multiplying the front wheel steering angular velocity ω by the front wheel steering angular velocity gain G2, which is the second correction value based on the vehicle speed V, and calculates the control lateral acceleration Gy by adding the first multiplication value and the second multiplication value to each other. By calculating the control lateral acceleration Gy in this way by using the control lateral acceleration calculation unit 41, the contribution of the control lateral acceleration Gy to the lateral acceleration of the vehicle 1 is caused to change with the vehicle speed V in such a manner that the response of the actual lateral acceleration to the steering operation changes with the vehicle speed V in an optimum fashion.

When calculating the control lateral acceleration Gy, the control lateral acceleration arithmetic calculation unit 49 uses the front wheel steering angular velocity ω acquired from the front wheel steering angular velocity sensor 35, instead of the time differential value of the front wheel steering angle δ acquired from the front wheel steering angle sensor 34. Thereby, Equation (1) used for calculating the control lateral acceleration Gy is prevented from being one of a higher order. As a result, calculation delay in the control device 31 can be minimized so that the control lateral acceleration Gy can be calculated in a more appropriate manner. Further, when the control device 31 holds the previous value (the value obtained in the previous control cycle) because of a failure to obtain the current steering angle information from the sensor, the steering angular velocity value is prevented from changing in an oscillatory manner. This topic will be discussed in a greater detail hereinafter.

The LPF 50 performs a low-pass filter process on the control lateral acceleration Gy calculated by the control lateral acceleration arithmetic calculation unit 49. As a result, the increase in the high frequency gain is suppressed so that undue fluctuations of the control lateral acceleration Gy in a high frequency region is prevented, and the noise in the control lateral acceleration Gy is substantially eliminated. By performing the low-pass filter process on the control lateral acceleration Gy by using the control lateral acceleration calculation unit 41 in this way, it becomes possible to apply a stable braking force to the vehicle 1.

The control lateral acceleration arithmetic calculation unit 49 calculates the control lateral acceleration Gy by using Equation (1) based on the front wheel steering angle δ, the front wheel steering angular velocity ω, and the vehicle speed V in this way. Therefore, the phase of the control lateral acceleration Gy can be advanced as compared with the conventional technique of calculating the control lateral acceleration Gy by using a planar two degrees of freedom model, and the additional deceleration Gxadd can be generated in the vehicle 1 at an early stage. This action and the effect thereof are discussed in the following in greater detail. In the following discussion, the conventional lateral acceleration calculated by using the planar two degrees of freedom model will be referred to as a conventional model lateral acceleration Gyc to distinguish it from the control lateral acceleration Gy of the present embodiment.

The conventional model lateral acceleration Gyc calculated by using the planar two degrees of freedom model of the vehicle 1 (the reference model disclosed in JP6395789B2) can be represented by Equation (2) given below.

$$G_{yc} = V\left(\frac{d}{dt}\beta + r\right) \tag{2}$$

where β is the vehicle body slip angle at the center of gravity, and r is the yaw rate around the center of gravity of the vehicle 1. Equation (2) may be expressed as Equation (3) given below by using the Laplace operator s.

$$G_{yc}(s) = Vs\beta(s) + Vr(s) \tag{3}$$

Equation (3) can also be represented as Equation (4) given below by using the transfer function of the vehicle body slip angle β with respect to the front wheel steering angle δ, the transfer function of the yaw rate r with respect to the front wheel steering angle δ, and the front wheel steering angle δ.

$$G_{yc}(s) = VsG_\delta^\beta(s)\delta(s) + VG_\delta^r(s)\delta(s) \tag{4}$$

The vehicle body slip angle β (s) in Equation (3) is given as in Equation (5) below.

$$\beta(s) = G_\delta^\beta(s)\delta(s) \tag{5}$$

The transfer function of the vehicle body slip angle β with respect to the front wheel steering angle δ in Equation (5) is expressed by Equation (6) given below.

$$G_\delta^\beta(s) = G_\delta^\beta(0)\frac{1 + T_\beta s}{1 + \frac{2\zeta s}{\omega_n} + \frac{s^2}{\omega_n^2}} \tag{6}$$

where $G_\delta^\beta(0)$: steady state vehicle body slip angle gain
$T_\beta$: vehicle body slip angle advance time constant
$\omega_n$: characteristic frequency
$\zeta$: damping factor The yaw rate r(s) in the formula of Equation (3) is as shown in Equation (7) given below.

$$r(s) = G_\delta^r(s)\delta(s) \tag{7}$$

The transfer function of the yaw rate r with respect to the front wheel steering angle δ in Equation (7) can be expressed by Equation (8) given below.

$$G_\delta^r(s) = G_\delta^r(0)\frac{1 + T_r s}{1 + \frac{2\zeta s}{\omega_n} + \frac{s^2}{\omega_n^2}} \tag{8}$$

where $G_\delta^r(0)$: steady state yaw rate gain
$T_r$: yaw rate advance time constant Equation (4) can be rewritten as in Equation (9) by substituting the above equations (6) and (8) thereinto.

$$G_{yc}(s) = VsG_\delta^\beta(0)\frac{1 + T_\beta s}{1 + \frac{2\zeta s}{\omega_n} + \frac{s^2}{\omega_n^2}}\delta(s) + VG_\delta^r(0)\frac{1 + T_r s}{1 + \frac{2\zeta s}{\omega_n} + \frac{s^2}{\omega_n^2}}\delta(s) \tag{9}$$

The product of the steady state yaw rate gain Gδr (0) and the vehicle speed V coincides with the steady state lateral acceleration gain as shown Equation (10) given below $$G_\delta^y(0) = VG_\delta^r(0) \tag{10}$$

Therefore, Equation (9) can be expressed as shown in Equation (11) given below by substituting Equation (10) thereinto.

$$G_{yc}(s) = VG_\delta^\beta(0)\left(\frac{1 + T_\beta s}{1 + \frac{2\zeta s}{\omega_n} + \frac{s^2}{\omega_n^2}}\right)s\delta(s) + G_\delta^y(0)\left(\frac{1 + T_r s}{1 + \frac{2\zeta s}{\omega_n} + \frac{s^2}{\omega_n^2}}\right)\delta(s) \tag{11}$$

The denominator part in parentheses in each of the first term and the second term of Equation (11) represents a second-order delay component which is determined by the vehicle specifications. Further, the vehicle body slip angle advance time constant (Tβ) of the numerator of the part in parentheses in the first term of Equation (11) is a differential component which is determined by the vehicle specifications. Further, the yaw rate advance time constant (Tr) of the numerator of the part in parentheses in the second term of Equation (11) is a differential component which is determined by the vehicle specifications. In the first term of the above equation (11), the product of the front wheel steering angle δ (s) and the Laplace operator s represents a differential component of the front wheel steering angle δ (s).

Thus, the control lateral acceleration Gy represented by Equation (1) given above can be approximated by Equation (11) by disregarding or ignoring the second-order delay component and the differential component which are determined by the specifications of the vehicle 1.

Based on such a consideration, the control lateral acceleration calculation unit 41 calculates the control lateral acceleration Gy which is advanced in phase with respect to the conventional model lateral acceleration Gyc by ignoring the second-order delay component determined by the vehicle specifications from the conventional model lateral acceleration Gyc which is obtained by using the planar two degrees of freedom model based on the vehicle state information. Thereby, as shown in FIG. 2, the control device 31 calculates the additional braking force Fbadd based on the control lateral acceleration Gy that is advanced in phase so that the delay due to the second-order delay component is suppressed, and the additional deceleration (braking force) can be applied to the vehicle 1 at an appropriate timing.

The differential components which are determined by the vehicle specifications are ignored or disregarded because they have a small influence on the control lateral acceleration Gy. Also by ignoring these differential components, the control lateral acceleration Gy can be advanced in phase with respect to the conventional model lateral acceleration Gyc obtained by using the planar two degrees of freedom model.

Figure 5:
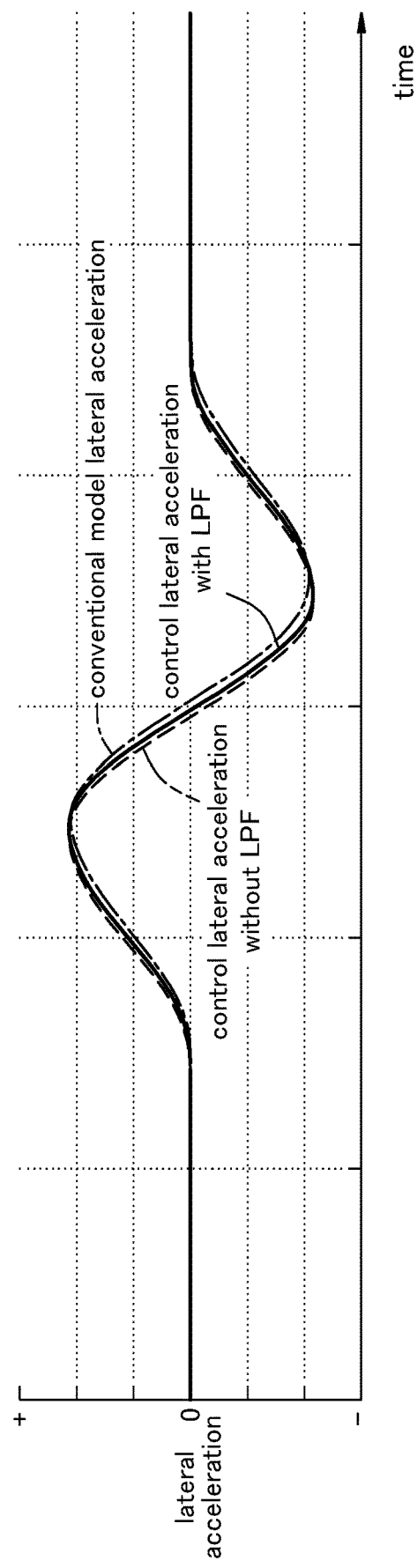
FIG. 5 is a time chart of various lateral accelerations at a certain vehicle speed.

FIG. 5 is a time chart of various lateral accelerations calculated at a certain vehicle speed. The various lateral accelerations (the three lateral accelerations) include the conventional model lateral acceleration Gyc calculated by using the planar two degrees of freedom model, the control lateral acceleration Gy calculated by using the control lateral acceleration arithmetic calculation unit 49, and the control lateral acceleration Gy which is additionally subjected to the filtering process by the LPF 50.

As shown in FIG. 5, when the steering wheel 17 is steered to the left or right, the conventional model lateral acceleration Gyc becomes a positive value and then a negative value. The control lateral acceleration Gy calculated by the control lateral acceleration arithmetic calculation unit 49 is advanced in phase relative to the conventional model lateral acceleration Gyc. The control lateral acceleration Gy which is additionally subjected to the filtering process by the LPF 50 is somewhat delayed in phase as compared with the control lateral acceleration Gy without filtering, but is well ahead of the conventional model lateral acceleration Gyc in phase.

Figure 6:
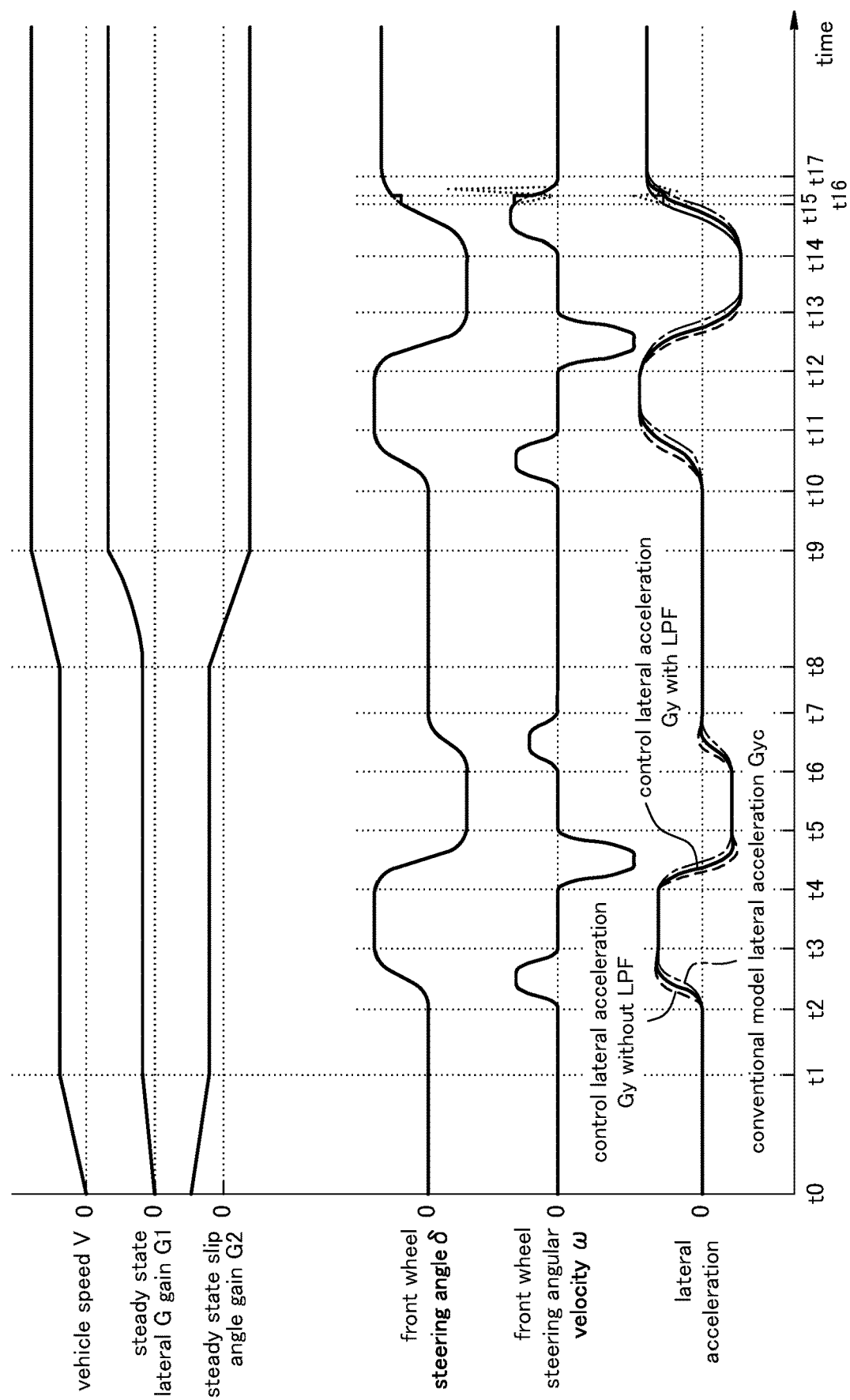
FIG. 6 is a time chart of various parameters showing a mode of calculating the control lateral acceleration.

FIG. 6 is a time chart showing a calculation example of the control lateral acceleration Gy. As shown in FIG. 6, the value of the front wheel steering angle gain G1 and the value of the front wheel steering angular velocity gain G2 both change during the intervals between the time point t0 and the time point t1, and between the time point t8 and the time point t9 due to the changes in the vehicle speed V. More specifically, the front wheel steering angle gain G1 increases as the vehicle speed V increases. The front wheel steering angular velocity gain G2 decreases as the vehicle speed V increases, and may even become a negative value when the vehicle speed V is equal to or higher than a predetermined value.

The front wheel steering angle δ increases from 0 during the time interval between the time point t2 and the time point t3, decreases to a negative value during the time interval between the time point t4 and the time point t5, and increases again back to value 0 during the time interval between the time point t6 and the time point t7. The front wheel steering angular velocity ω becomes positive during the time intervals between the time point t2 and the time point t3, and between the time point t6 and the time point t7, and becomes negative during the time interval between the time point t4 and the time point t5. During the time periods between the time point t2 and the time point t3, between the time point t4 and the time point t5, and between the time point t6 to time point t7, the control lateral acceleration Gy before filtering (without filtering), the control lateral acceleration Gy after filtering (with filtering), and the conventional model lateral acceleration Gyc start changing in this order.

A similar behavior can be observed during the time interval between the time point t10 and the time point t17 as that observed during the time interval between the time point t2 and the time point t7. However, the steering angle information (the front wheel steering angle δ acquired by the front wheel steering angle sensor 34 and the front wheel steering angular velocity ω acquired by the front wheel steering angular velocity sensor 35) failed to be inputted from the sensors to the control device 31 at the time point t16, and is inputted only at the time point t17. In this manner, when the steering angle information is temporarily lost (failure to update the information occurs), the control device 31 retains the immediately preceding steering angle information (at the time point t15) (the steering angle information of the previous control cycle), and the steering angle information is used thereafter (at the time point t16) (in the current control cycle). Therefore, in appearance, the steering angle information does not change from the time point t15 to the time point t16, and changes somewhat more significantly than the actual change that may have taken place from the time point t16 to the time point t17.

As described above, the control lateral acceleration arithmetic calculation unit 49 uses the front wheel steering angle δ acquired from the front wheel steering angle sensor 34 and the front wheel steering angular velocity ω acquired from the front wheel steering angular velocity sensor 35 to calculate the control lateral acceleration Gy. Therefore, the control lateral acceleration Gy also does not change from the time point t15 to the time point t16, and changes slightly more significantly than the actual change from the time point t16 to the time point t17.

In the example for comparison shown in FIG. 6, the front wheel steering angular velocity ω obtained by time differentiating the front wheel steering angle δ, and the control lateral acceleration Gy obtained from this front wheel steering angular velocity ω and the front wheel steering angle δ are indicated by dotted lines (during the time intervals between the time point t15 and the time point t16). In this case, from the time point t15 to the time point t16, the control device 31 holds the value of the front wheel steering angle δ, and since the front wheel steering angle δ does not change, the front wheel steering angular velocity ω becomes 0. From the time point t16 to the time point t17, the front wheel steering angle δ changes significantly from the held value so that the front wheel steering angular velocity ω sharply increases, and then returns to the actual value. In this way, the front wheel steering angular velocity ω calculated by the time differentiation changes sharply in an oscillatory manner, and the control lateral acceleration Gy calculated by using this sharply changing front wheel steering angular velocity ω also changes sharply.

In the present embodiment, since the control lateral acceleration calculation unit 41 uses the front wheel steering angular velocity ω acquired from the front wheel steering angular velocity sensor 35, instead of the time differentiated value of the front wheel steering angle δ, to calculate the control lateral acceleration Gy, the formula in Equation (1) for calculating the control lateral acceleration may consist of a relatively low order formula. As a result, the change in the front wheel steering angular velocity ω is suppressed, and any discontinuity (sudden change) of the control lateral acceleration Gy due to the information discontinuity is alleviated.

Figure 7:
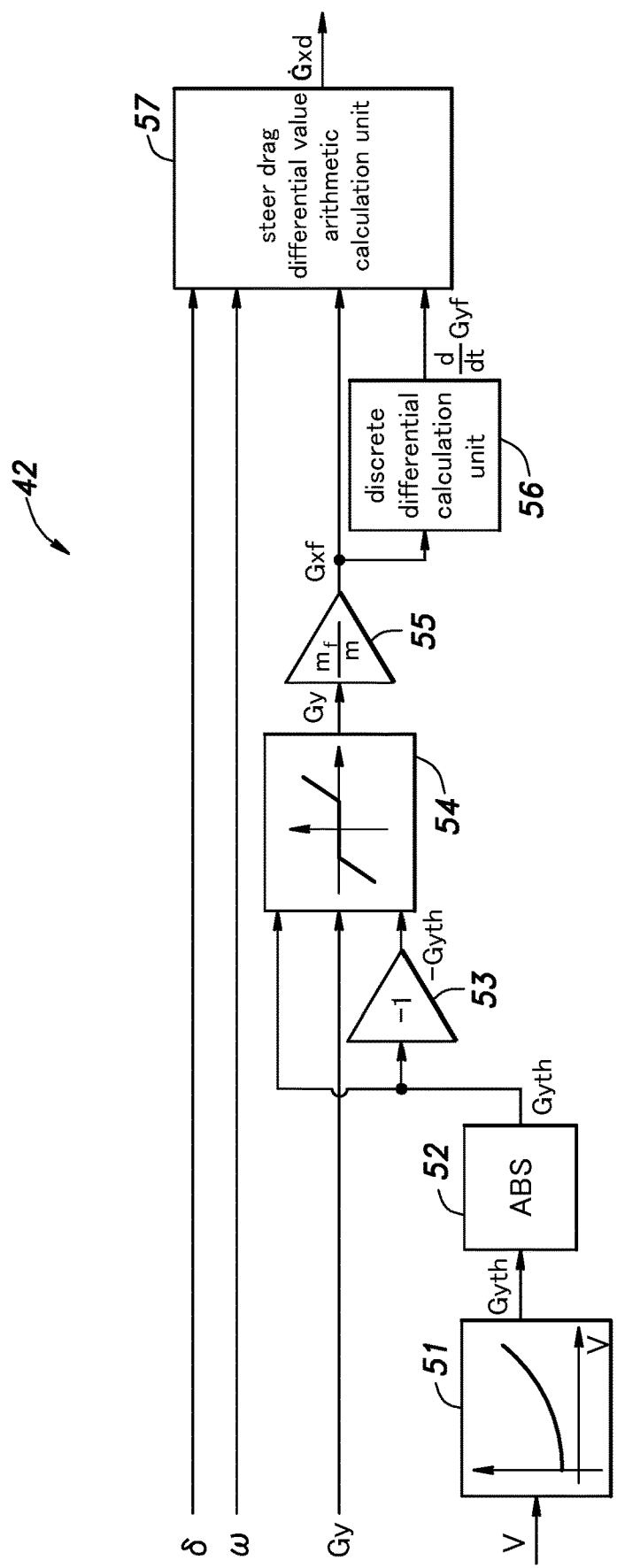
FIG. 7 is a functional block diagram of a steer drag differential value calculation unit of the control device.

FIG. 7 is a functional block diagram of the steer drag differential value calculation unit 42. As shown in FIG. 7, the steer drag differential value calculation unit 42 includes a dead zone threshold value setting unit 51, an absolute value calculation unit 52, a negative value calculation unit 53, a dead zone processing unit 54, a control lateral acceleration front wheel component calculation unit 55, a discrete differential calculation unit 56, and a steer drag differential value arithmetic calculation unit 57.

The dead zone threshold value setting unit 51 sets a threshold Gyth to be used for the dead zone process for the control lateral acceleration Gy according to the vehicle speed V. More specifically, the dead zone threshold value setting unit 51 sets the threshold value Gyth to a positive value which gets larger with a higher vehicle speed V. The absolute value calculation unit 52 calculates the absolute value of the threshold value Gyth set by the dead zone threshold value setting unit 51. Since the dead zone threshold value setting unit 51 sets a positive value to the threshold value Gyth, the absolute value calculation unit 52 outputs the threshold value Gyth as it is. The negative value calculation unit 53 multiplies the threshold value Gyth by −1 to convert the threshold value Gyth to a negative value, and outputs the converted negative value threshold value −Gyth.

The dead zone processing unit 54 performs a dead zone process on the control lateral acceleration Gy by using the positive threshold value Gyth and the negative value threshold value −Gyth. More specifically, when the absolute value of the inputted control lateral acceleration Gy is equal to or less than the threshold value Gyth (|Gy|≤Gyth), the dead zone processing unit 54 outputs 0 as the control lateral acceleration Gy as the dead zone process, and when the absolute value of the inputted control lateral acceleration Gy is larger than the threshold value Gyth (|Gy|>Gyth), the absolute value of the control lateral acceleration Gy is reduced by the threshold value Gyth, and this reduced value is outputted as the control lateral acceleration Gy as the dead zone processing.

By performing the dead zone process in this way, the dead zone processing unit 54 outputs 0 as the control lateral acceleration Gy in the dead zone region where the absolute value is equal to or less than the predetermined threshold value Gyth. Therefore, in the dead zone region, no additional deceleration Gxadd is generated so that the vehicle behavior is the same as that of the base vehicle on which the vehicle control system 30 is mounted. Therefore, in the range of the front wheel steering angle δ where the vehicle travels substantially straight ahead (the dead zone region), the steering reaction force is the same as that of the base vehicle, and the vehicle 1 maintains the same responsiveness as the base vehicle. In this operating condition, since the frequency of occurrence of the additional braking force Fbadd decreases, the decrease in the durability of the brake system 22 and the brake lamp is not adversely affected. Further, in the operating range corresponding to this control dead zone, since the additional braking force Fbadd does not act on the vehicle 1 in the range where the front wheel steering angle δ is small, the operation of the vehicle control system 30 is prevented from interfering with the operation of other functional devices that are configured to operate when the vehicle travels straight ahead. On the other hand, when the control lateral acceleration Gy starts exceeding the predetermined threshold value Gyth, the control lateral acceleration is outputted as a continuous value increasing from 0 following the dead zone process. Therefore, the additional deceleration Gxadd increases gradually so that the cornering performance of the vehicle 1 can be improved while maintaining a smooth vehicle behavior.

The control lateral acceleration front wheel component calculation unit 55 multiplies the control lateral acceleration Gy which has been subjected to the dead zone processing by a front axle mass ratio mf/m (which is the ratio of the front axle mass mf to the vehicle mass m) to calculate a control lateral acceleration front wheel component Gyf which is the front wheel component of the control lateral acceleration Gy. The discrete differential calculation unit 56 differentiates the control lateral acceleration front wheel component Gyf to calculate the control lateral acceleration front wheel component differential value d/dt (Gyf). The steer drag differential value arithmetic calculation unit 57 calculates the steer drag differential value d/dt (GxD) (=d/dt (Gyf·δ)), which is the differential value of the steer drag GxD (=Gyf·δ), from the front wheel steering angle δ, the front wheel steering angular velocity ω, the control lateral acceleration front wheel component Gyf and the control lateral acceleration front wheel component differential value d/dt (Gyf) by using Equation (12) given in the following.

$$\frac{d}{dt}(G_{yf} \cdot \delta) = \frac{d}{dt}(G_{yf}) \cdot \delta + G_{yf} \cdot \dot{\delta} \tag{12}$$

Figure 8:
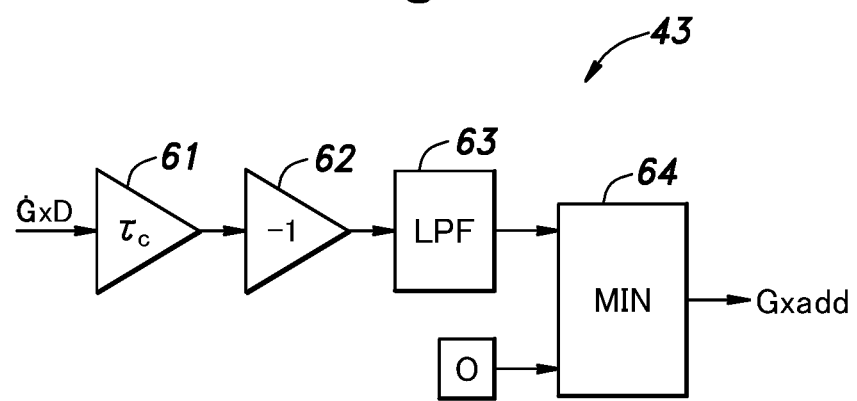
FIG. 8 is functional block diagram of an additional deceleration calculating unit of the control device.

FIG. 8 is a functional block diagram of the additional deceleration calculation unit 43. As shown in FIG. 8, the additional deceleration calculation unit 43 includes an advance time constant multiplication unit 61, a negative value calculation unit 62, an LPF 63 (low-pass filter), and a low value selection unit 64.

The advance time constant multiplication unit 61 multiplies the steer drag differential value d/dt (GxD) by the advance time constant τc. As a result, the magnitude of the steer drag differential value d/dt (GxD), which is the basis for calculating the additional deceleration Gxadd shown in FIG. 3, is changed so that the degree of phase advance with respect to the deceleration of the steer drag of the total deceleration is adjusted. The negative value calculation unit 62 converts the product of the steer drag differential value d/dt (GxD) and the advance time constant τc into a negative value by multiplying −1 to the product so that the fore and aft acceleration generated in the vehicle 1 becomes a negative value (deceleration). The LPF 63 performs a low-pass filter process on the value converted into a negative value by the negative value calculation unit 62. As a result, the increase in the high frequency gain is suppressed so that the fluctuations of the additional deceleration Gxadd in the high frequency region is suppressed, and noise is removed. The low value selection unit 64 compares the value output from the LPF 63 with 0, selects a lower value to be outputted as the additional deceleration Gxadd. The additional deceleration Gxadd outputted from the low value selection unit 64 is a value equal to or smaller than 0.

As shown in FIG. 2, the additional deceleration Gxadd output that is outputted from the additional deceleration calculation unit 43 is subjected to an appropriate correction process by the additional deceleration correction unit 44. The corrected additional deceleration Gxadd that is outputted from the additional deceleration correction unit 44 is used by the additional braking force calculation unit 45 to calculate the additional braking force Fbadd. The control device 31 adds the additional braking force Fbadd output from the additional braking force calculation unit 45 to the target braking force Fbt, and causes the power plant 6 and/or the brake system 22 to generate the combined target braking force to which the additional braking force Fbadd is added. As a result, as shown in FIG. 3, a deceleration given as a combination of the additional deceleration Gxadd and the deceleration due to the steer drag is generated in the vehicle 1 so that the cornering performance of the vehicle 1 is improved.

Figure 9:
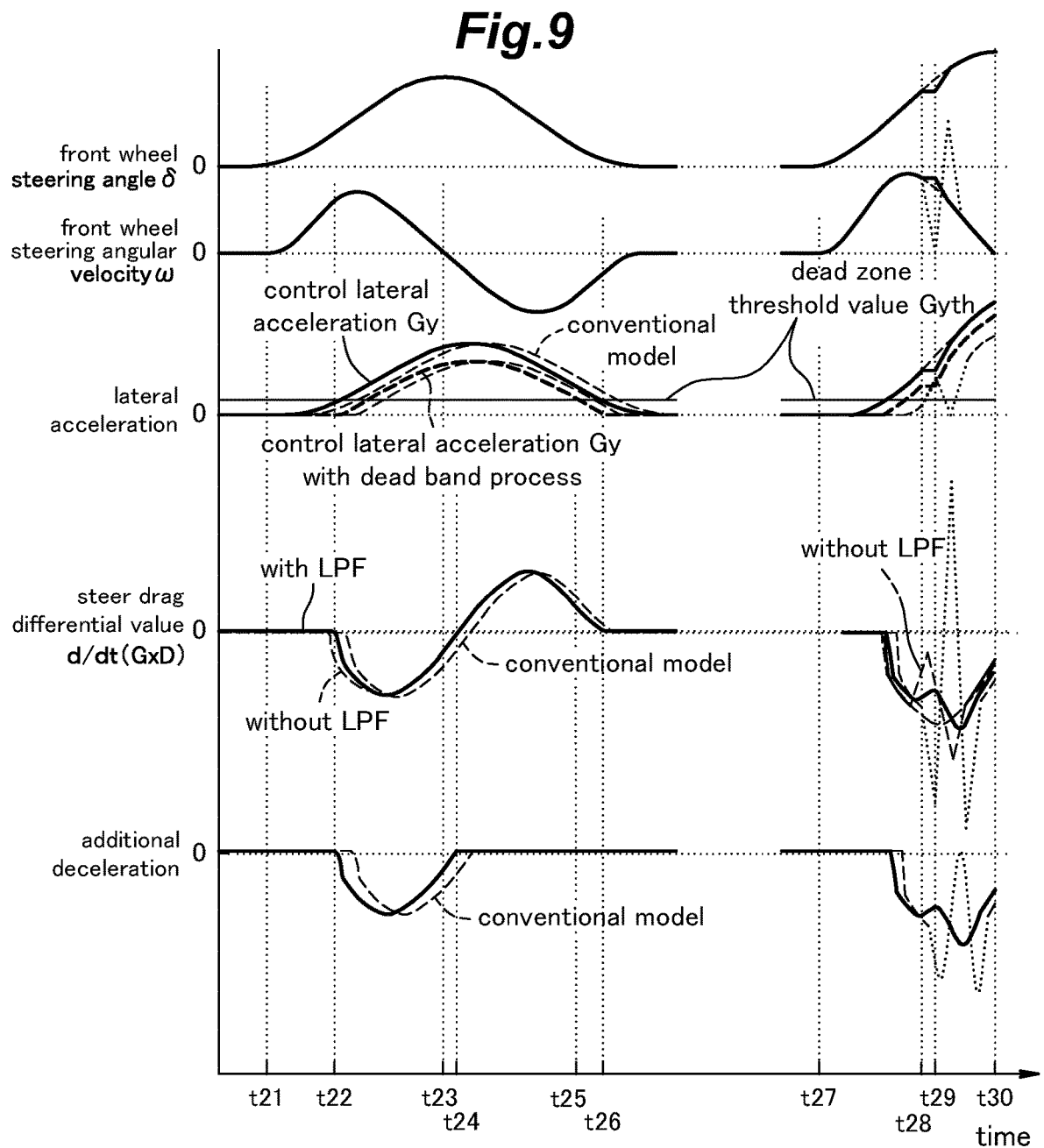
FIG. 9 is a time chart of various parameters showing a mode of calculating an additional deceleration.

FIG. 9 is a time chart showing an example of the process of calculating the additional deceleration Gxadd. As shown in FIG. 9, the steering wheel 17 is operated from the time point t21 to the time point t26, and the control lateral acceleration Gy is generated accordingly. The thin broken lines in the graph indicate the conventional model based on the conventional model lateral acceleration Gyc calculated by using the planar two degrees of freedom model. When the control lateral acceleration Gy exceeds the threshold value Gyth of the dead zone at the time point t22, the control lateral acceleration Gy subjected to the dead zone processing by the dead zone processing unit 54 (FIG. 7) begins to increase, and various parameters calculated by using the control lateral acceleration Gy start changing accordingly.

During the time interval between the time point t22 and the time point t24 in which the control lateral acceleration Gy subjected to the dead zone processing increases, an additional deceleration Gxadd corresponding to the steer drag differential value d/dt (GxD) is generated. In the present embodiment, since the control lateral acceleration Gy is advanced in phase with respect to the conventional model lateral acceleration Gyc, the additional deceleration Gxadd appears with an advanced phase as compared with the conventional model.

The control lateral acceleration Gy is processed by the dead zone processing unit 54 as described above so that the absolute value thereof is maintained at 0 in the dead zone region where the absolute value is equal to or less than the predetermined threshold value Gyth. When the control lateral acceleration Gy starts exceeding the predetermined threshold value Gyth, the control lateral acceleration Gy subjected to the dead zone process is outputted as a continuous value that increases from 0. As a result, the additional deceleration Gxadd is generated as a gradually increasing value so that the cornering performance of the vehicle 1 can be improved while ensuring a smooth vehicle behavior.

During the time interval between the time point t27 and the time point t30 in FIG. 9, the front wheel steering angle δ is increased by the operation of the steering wheel 17, and at the time point t29, the steering angle information temporarily fails to be inputted from the sensor to the control device 31. Soon thereafter, the steering angle information is inputted once again. When the steering angle information is temporarily lost in this way (failure to update information), the control device 31 retains the immediately preceding steering angle information at the time point t28, and this steering angle information is used as the current steering angle information (at the time point t29) (the steering angle information is not updated). As described above, the control lateral acceleration arithmetic calculation unit 49 uses the front wheel steering angle δ acquired from the front wheel steering angle sensor 34 and the front wheel steering angular velocity ω acquired from the front wheel steering angular velocity sensor 35 to calculate the control lateral acceleration Gy. Therefore, the control lateral acceleration Gy changes substantially before and after the time point t29.

In the graph for the control lateral acceleration in FIG. 9, the dotted thin lines (during the time interval between the time point t27 and the time point t30) indicate the front wheel steering angular velocity ω acquired by the control device 31 by time-differentiating the front wheel steering angle δ, the control lateral acceleration Gy as calculated by using this front wheel steering angular velocity ω and the front wheel steering angle δ, and various parameters calculated from this control lateral acceleration Gy. In the case of this example for comparison, the front wheel steering angular velocity ω calculated by time differentiation fluctuates significantly in an oscillatory manner before and after the time point t29, and the control lateral acceleration Gy calculated from this front wheel steering angular velocity ω also fluctuates significantly. Therefore, various parameters and the additional deceleration Gxadd calculated from this control lateral acceleration Gy also fluctuate significantly.

In the present embodiment, the control lateral acceleration calculation unit 41 (FIG. 4) calculates the control lateral acceleration Gy by using the front wheel steering angular velocity ω acquired from the front wheel steering angular velocity sensor 35 instead of the time differentiated value of the front wheel steering angle δ. By using Equation (1) given above, the control lateral acceleration calculation equation is represented by a low order equation. As a result, sharp changes in the front wheel steering angular velocity ω and the control lateral acceleration Gy are suppressed, and any rapid fluctuations (sudden changes) of the additional deceleration Gxadd due to information discontinuity are alleviated.

Further, the steer drag differential value calculation unit 42 (FIG. 7) calculates the steer drag differential value (d/dt GxD) by using the front wheel steering angular velocity ω acquired from the front wheel steering angular velocity sensor 35, instead of the time differentiated value of the front wheel steering angle δ, so that rapid fluctuations (sudden changes) of the additional deceleration Gxadd due to information discontinuity are alleviated.

Figure 10:
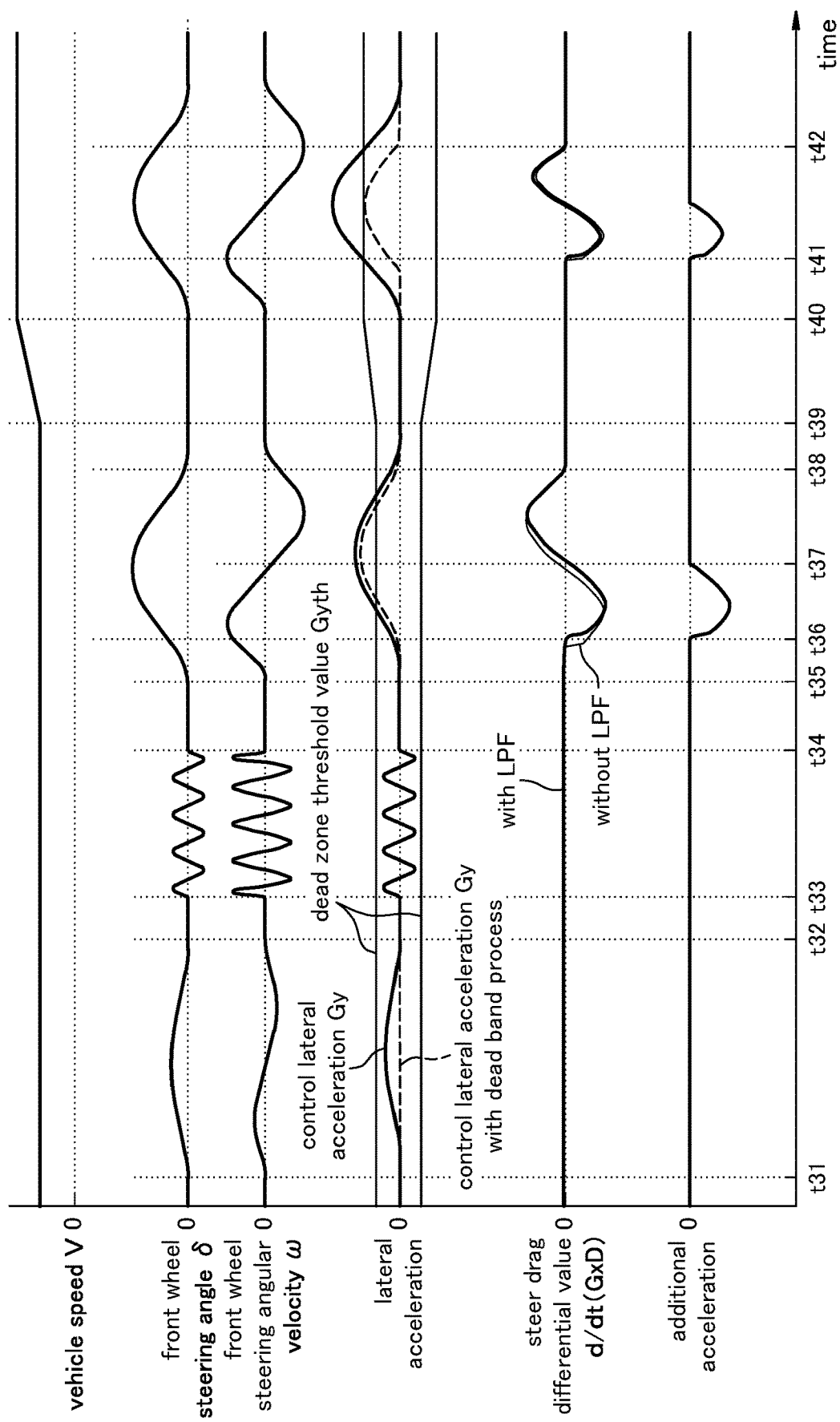
FIG. 10 is a time chart of various parameters showing another mode of calculating the additional deceleration.

FIG. 10 is a time chart showing another example of the process of calculating the additional deceleration Gxadd. As shown in FIG. 10, in this example, the steering wheel 17 is operated during the time interval between the time point t31 and the time point t32, but since the control lateral acceleration Gy does not exceed the threshold value Gyth of the dead zone, the control lateral acceleration Gy is maintained at 0 value following the dead zone process. Therefore, the additional deceleration Gxadd is not generated. Therefore, no additional deceleration Gxadd is created so that the vehicle behaves in the same as the base vehicle on which the vehicle control system 30 is mounted. Therefore, the handling of the vehicle is no different from that of the base vehicle.

Between the time interval between the time point t33 and the time point t34, the front wheel steering angle δ fluctuates across 0° due to slight corrective operation of the front wheel steering angle δ performed during a straight ahead travel via the steering wheel around 0° steering angle, and kickback from the road surface. In such a situation, as long as the control lateral acceleration Gy is equal to or less than the threshold value Gyth of the dead zone, no additional deceleration Gxadd is created so that any undesired frequent activation of the control action can be avoided.

During the time interval between the time point t35 and the time point t39, the vehicle behavior changes similarly as during the time interval between the time point t21 and the time point t26 shown in FIG. 9. The vehicle speed V increases from the time point t39 to the time point t40, and the threshold value Gysth in the dead zone process for the control lateral acceleration Gy is set (FIG. 7) to be relatively large in absolute value by the dead zone threshold value setting unit 51 due to the high vehicle speed V. Therefore, when the steering wheel 17 is operated after the time point t40 in the same manner as during the time interval between the time point t35 and the time point t39, the control lateral acceleration Gy subjected to the dead zone process becomes smaller in value than during the time interval between the time point t35 and the time point t39. Therefore, the additional deceleration Gxadd is generated at a timing later than the time point t41 at which the control lateral acceleration Gy exceeds the threshold value Gyth, and the generated additional deceleration Gxadd (absolute value) is smaller than that during the time interval between the time point t36 and the time point 37. In other words, the additional deceleration Gxadd is generated with an appropriate magnitude and at an appropriate timing according to the vehicle speed V.

By setting the threshold value Gyth to be greater in value with an increasing vehicle speed V, the threshold value Gyth is made to appropriately correspond to the vehicle characteristics such as the steering reaction and the cornering response which change with the vehicle speed V, and the additional braking force Fbadd is prevented from acting on the vehicle 1 with an increased frequency with an increased vehicle speed V.

The present invention has been described in terms of a specific embodiment, but is not limited by such an embodiment, and can be modified and substituted in various ways without departing from the scope of the present invention. For instance, the specific configurations and arrangements of each member or portion, quantity, angle, calculation formula, etc. can be appropriately changed within the scope of the present invention. Further, the components shown in the above embodiments are not entirely indispensable, but can be appropriately selected, omitted and substituted.

The invention claimed is:

1. A vehicle control system, comprising:
a braking force generator that generates a braking force that acts on a vehicle;
a control device that controls the braking force generated by the braking force generator; and
a vehicle state information acquisition device that acquires vehicle state information including a vehicle speed, a steering angle of front wheels of the vehicle, and a steering angular velocity of the front wheels, the vehicle state information acquisition device including a velocity sensor that detects an angular velocity or a velocity corresponding to the steering angular velocity of the front wheels,
wherein the control device includes
a control lateral acceleration calculation unit that calculates a control lateral acceleration by calculating Equation (1) given below $$G_y = G1 \cdot \delta + G2 \cdot \omega \quad (1)$$

where Gy is the control lateral acceleration, G1 is a front wheel steering angle gain, δ is the steering angle, G2 is a front wheel steering angular velocity gain, and ω is the steering angular velocity,
a steer drag differential value calculation unit that calculates a steer drag differential value obtained by differentiating a steer drag which is given as a component of a lateral force of the front wheels directed rearward of the vehicle according to the control lateral acceleration and the vehicle state information,
an additional deceleration calculation unit that calculates an additional deceleration to be applied to the vehicle according to the steer drag differential value, and
an additional braking force calculation unit that calculates an additional braking force to be generated by the braking force generator according to the additional deceleration,
wherein the control lateral acceleration calculation unit is provided with a front wheel steering angle gain map defining a relationship between the vehicle speed and the front wheel steering angle gain and a front wheel steering angular velocity gain map defining a relationship between the vehicle speed and the front wheel steering angular velocity gain, sets a first correction value which changes corresponding to the vehicle speed extracted from the front wheel steering angle gain map as the front wheel steering angle gain, and sets a second correction value which changes corresponding to the vehicle speed extracted from the front wheel steering angle velocity gain map as the front wheel steering angular velocity gain, and
wherein the control device causes the braking force generator to generate the additional braking force calculated by the additional braking force calculation unit.

2. The vehicle control system according to claim 1, wherein the control lateral acceleration calculation unit performs a low pass filter process on the control lateral acceleration.

3. The vehicle control system according to claim 1, wherein the control device further comprises a dead band processing unit that performs a dead band process on the control lateral acceleration, the dead band processing unit outputting zero for the control lateral acceleration when an absolute value of the inputted control lateral acceleration is equal to or smaller than a prescribed threshold value, and a value which is smaller by the threshold value than the absolute value of the inputted control lateral acceleration for the control lateral acceleration when the absolute value of the inputted control lateral acceleration is larger than the prescribed threshold value.

4. The vehicle control system according to claim 3, wherein the threshold value becomes larger with an increase in the vehicle speed.

5. The vehicle control system according to claim 1, wherein the steer drag differential value calculation unit calculates the steer drag differential value by using the steering angular velocity as the vehicle state information.

* * * * *